March 31, 1964
J. M. CAUGHEY
3,127,159
FRAME ATTACHMENT FOOT STRUCTURE FOR
CUSHION SPRING ELEMENTS
Filed April 9, 1962
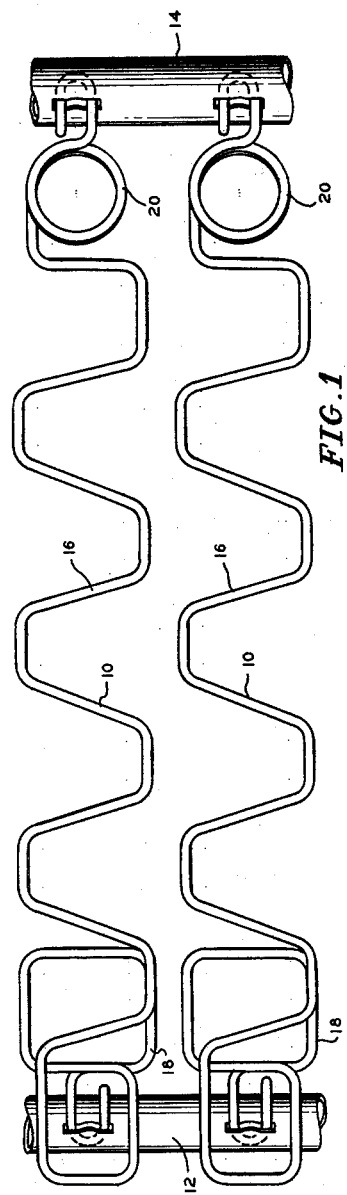
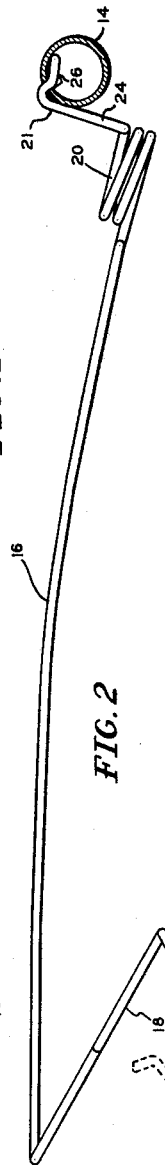
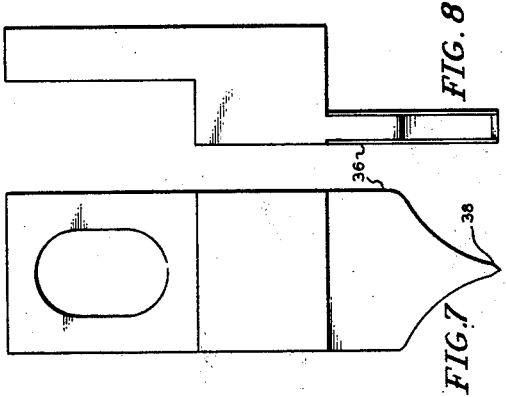
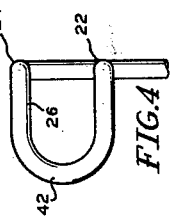
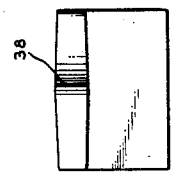
INVENTOR
JOHN M. CAUGHEY
BY *Beaman & Beaman*
ATTORNEY

United States Patent Office 3,127,159
Patented Mar. 31, 1964

3,127,159
FRAME ATTACHMENT FOOT STRUCTURE FOR CUSHION SPRING ELEMENTS
John M. Caughey, Adrian, Mich., assignor to Stubnitz Greene Corporation, Adrian, Mich., a corporation of Michigan
Filed Apr. 9, 1962, Ser. No. 185,967
4 Claims. (Cl. 267—110)

The present invention relates to improvements in resilient seats and backs used in vehicles and furniture, and the like, being particularly concerned with the provision of a novel connection between the frame structure of the seat or back and the spring elements supported therein, as well as the method and means used in the fabrication of the connection.

It has been found in practice that my improved method of fabrication of the connection between the frame and spring elements is particularly useful with tubular metal frames and the improvement is characterized by the fact that the frame may be formed or shaped to receive the terminal portions of the spring elements without creating any metal slug disposal problem and with complete elimination of welded appendages or special anchoring or mounting clips, or the like.

To facilitate the initial installation of the spring elements in their frame during the manufacture of seats and backs for the vehicle and furniture industry, and to further provide for convenient removal and replacement of spring elements which may become broken in service, or for other reasons requiring replacement, the terminal portions of the spring elements are shaped to be "hooked" and "unhooked" into and from their position of support in the frame portions through manipulation and deflection of the spring elements in directions entirely different from the deflections and manipulations of the spring elements and their terminal portions under conditions in service with complete elimination of inadvertent detachment of terminal portions of the spring elements from their associated frame portions.

Thus, an object of the invention is to provide an improved connection between frame portions and spring elements of resilient seat and back constructions used in the vehicle and furniture fields, as well as improved means and methods of fabricating the same.

Another object is to provide an improved connection between the frame portions and the terminal ends of linear type spring elements extending in bridging relation to opposed frame portions.

Another object of the invention is to provide a connection between a frame member and the terminal end of a spring element characterized by the fact that the frame portion of the connection is solely formed from the body portion of the frame member.

A further object of the invention is to provide an improved connection and anchorage between a frame member and a terminal portion of a linear type spring in which the frame is provided with an elongated slot and the terminal portion of the spring element has a lateral anchorage portion which is threaded through the slot, fulcrums upon a side of the slot and abuts an interior surface of the frame.

A still further object of the invention is to provide a connection between a slotted frame portion and a terminal portion of a linear spring element in which the terminal portion is so shaped that the path of movement required to attach and detach the terminal portion from its slotted connection is not duplicated with the spring element in service.

A still further object of the invention is to provide a method of slotting a tubular seat or back frame to receive the terminal portion of a linear type spring element in which the frame is lanced by a punch without removal of material, and the material displaced to form the slot provides depending abutments at the end of the slot and the frame is dimpled adjacent the slot to enhance the interior abutment character of the frame.

These and other objects and advantages of the invention will appear from the following specification and claims.

In the drawings,

FIG. 1 is a plan view of a portion of a seat construction embodying the invention, FIG. 2 is a side elevational view of the structure shown in FIG. 1, FIG. 3 is an enlarged elevational view of the terminal portion of the linear spring element, FIG. 4 is a plan view of the terminal portion shown in FIG. 3, FIG. 5 is an enlargement of the connection between the frame portion and a terminal portion of the spring element, FIG. 6 is a fragmentary view of the frame structure showing the slot connection, FIG. 7 is a side view of a punch for lancing the slot in the frame, FIG. 8 is a side view of the punch structure shown in FIG. 7, and FIG. 9 is an end view of the punch structure shown in FIGS. 7 and 8.

The improved connection provided by the present invention between the spring elements and the frame structure, as illustrated in FIGS. 1 and 2, is shown applied to a well known type of linear spring element 10 fabricated from spring steel wire to the desired form and disposed in bridging relation to opposed tubular frame portions 12 and 14. It will be understood that while the present invention is particularly adapted to tubular frame structure and to slotting the frame portions by a lancing operation, it also lends itself to use in connection with frames of section other than tubular and the provision of slots by other means.

Each linear spring element 10 has a zig-zag frame-bridging and load-supporting portion 16 which merges at one end into fishmouth form at 18 and at the other end into a coil 20.

The terminal portions 21, at opposite ends of each spring element 10, are shaped as more clearly shown in FIGS. 3 and 4 to provide a pair of spaced parallel leg portions 22 and 24, the short leg portion 22 being only of sufficient length to provide tangential contact with the outer surface of the frame portions and the leg portion 24, of longer length merging with the fishmouth 18 at one end of the spring element 10 and with the coil 20 at the other end.

The leg portions 22 and 24 of the terminal portions 21 have a common laterally disposed return-bent portion 26 which is preferably formed with angularly related portions 28 and 30, as viewed in side elevation.

The frame portion of the improved connection takes the form of an elongated slot 32 defined by the tubular body of the frame portions 12 and 14. Preferably, the slot 32 is formed by a lancing operation which has the advantage of not removing the metal forming the slot and, thus, avoiding a slug disposal problem. The lancing operation merely rolls the metal back to provide the slot and leaves depending portions 34 at opposed ends of the slot 32.

The lancing operation may be formed by a suitable punch 36 having a pointed end 38 and being of the form shown in FIGS. 7, 8 and 9 in which all surfaces of the punch are tapered to facilitate the removal of the punch following the lancing operation. The initial pressure of the pointed end 38 of the punch 36 against the frame portions results in a slight dimpling or deformation of the tubular wall of the frame portion, as shown at 40. This dimpling takes place prior to the rupturing of the wall of the frame portion by the punch 36 and the lancing of the slot 32. The dimpling of the frame portion adjacent the elongated sides of the slot tends to stiffen the sides of the slot and to enhance the abutment character of the inner wall of the frame portion for reasons hereinafter appearing.

To insert the terminal portions 21 of the linear spring elements 10 into the slots 32, the angularity of the portions 28 and 30 require the insertion of the portion 26 with sequential radial alignment, first between the portion 28 and the slot 32 and then between the portion 30 and the slot 32 with an advancement or threading of these portions through the slot. To effect such sequential radial alignment of the portions 28 and 30 with the slot 32, a partial rotation of the portion 21 is required. Once inserted into the slot 32, the terminal portion 21 will have fulcrum engagement with one elongated side of the slot 32 and an abutment engagement with the interior wall surface of the frame portion at the end portion 42 of the terminal portion 21.

It will be appreciated that with the terminal portion 21 at the opposite ends of the spring element 10 fully inserted into aligned slots 32 defined in the opposed frame portions 12 and 14, that the deflection of the spring elements 10 in load-supporting service will cause the terminal portions 21 to fulcrum around a longitudinal edge of the asosciated slots 32 with the torque developed on opposite ends of the spring elements 10 being resisted by the engagement of the end portions 42 with the inside wall of the tubular frame portions 12 and 14. Also, it will be understood that the developed torque will bring the leg portions 24 into tangential engagement with the outer wall of the tubular frame portions 12 and 14.

In practice, to insert a spring element 10 into the frame portions 12 and 14, either terminal end portion 21 may be selected for the initial threading of the laterally disposed return-bent portion 26 into the selected slot 32. Because of the angular disposition of the portions 28 and 30, to bring the portion 28 into radial alignment with the slot 32, it is necessary to first dispose the spring element 10 in the dotted line position, as indicated in FIG. 2, and thereafter to swing the spring element 10 clockwise into the full line position of FIG. 2 as the portions 28 and 30 are sequentially threaded through the slot 32.

With the terminal end portion 21 of the spring element 10 in its selected slot 32 of the frame portion 12 and disposed in the full line position shown in FIG. 2, the terminal portion 21, at the opposite end of the spring element 10, is brought into radial alignment with its selected slot 32 by deformation and longitudinal extension of the spring element 10 to the extent permitting the portions 28 and 30 to be sequentially threaded through the selected slot 32. Once the portion 26 is received within its selected slot 32, the spring element 10 can be released and the resulting clockwise movement will dispose the spring elements 10 in the full line position shown in FIG. 2 with the terminal portions 21 at opposite ends of the spring element 10 in stressed anti-rattle engagement within the selected slots 32 of the frame portions 12 and 14.

When the spring elements 10 are loaded in service the weight being supported is transferred to the frame portions 12 and 14 by that part of the terminal portions 21 engaging the sides of the slots 32 as a fulcrum, the load causing the terminal portions 21 to slightly rotate about the fulcrum defined by the edge of the slots 32 to bring the end portion 42 into abutment with the interior surface of the tubular portions 12 and 14 to restrict further movement and to bring the stress of the load upon the portions 28 and 30 of the legs 24.

As will be seen from FIG. 2, the portion 30 of the leg 24 is hooked over one longitudinal edge of its associated slot 32 to support the load upon the spring element 10, whereas the portion 28 of the leg 24, being angularly disposed to the portion 30, prevents detachment of the terminal end portion 21 from its associated frame portion except in the event the spring element 10 is so distorted, or swung in a direction counter to its normal load-supporting position, as to bring the portions 28 into radial alignment with the slots 32. While the short leg 22 is not subjected to torsion under the supported loads upon the spring element 10, the leg 22 and its portions 28 and 30 do lend stability to the support of the spring elements 10 through the connection between the terminal portions 21 and the frame portions 12 and 14.

The removal of the spring element 10 from the frame portions 12 and 14 for purposes of replacement of a broken spring element, or for any other reason, is carried out by reversing the steps of installation above described.

The depending portions 34, at the end of each slot 32, provide a wide shoulder at each end of the slots 32 for engagement by the sides of the laterally disposed portion 26 of the terminal portions 21. The slots 32 are slightly wider than the diameter of the wire from which the terminal portions 21 are formed, there being sufficient clearance to permit the portions 26 to fulcrum about an edge of the slots 32, bringing the ends 42 into abutting relation with the interior surface of the frame portions 12 and 14 without any binding taking place between the portions 26 and the slots 32.

I claim:

1. In a seat or back construction for vehicles, furniture, and the like, the combination of a frame, a wire spring element having a terminal portion, an elongated slot defined in said frame, said terminal portion having a pair of parallel legs having a common return-bent portion angularly disposed to said legs and extending into said slot, said last portion defining a fulcrum portion and an abutment portion, said fulcrum portion being hooked over an edge of said slot and said abutment portion engaging with a surface of said frame to one side of said slot.

2. In a seat or back construction for vehicles, furniture, and the like, as defined in claim 1, wherein said frame is tubular and said legs have tangential contact with the outer surface of said frame adjacent said slot.

3. In a seat or back construction for vehicles, furniture, and the like, a frame and spring terminal connection comprising a tubular frame portion having an elongated slot defined in the surface thereof and extending parallel to the longitudinal axis of the frame portion, the slot defining part of said frame portion having that shape resulting from a lancing operation of its wall, the portions of said wall displaced to form said slot depending from the ends of said slot to form abutments for the sides of the spring terminal, the sides of said slot parallel to the longitudinal axis thereof being inwardly dimpled intermediate said ends to reinforce said sides, and a spring terminal portion resting on one of said slot sides as a fulcrum and extending through said slot to engage with the interior surface of said frame portion adjacent the other of said slot sides, the sides of said terminal portion engaging said depending wall positions as abutments.

4. In a seat or back construction for vehicles, furniture, and the like, a frame and spring terminal connection comprising a tubular frame portion having an elongated slot defined in the surface thereof and extending parallel to the longitudinal axis of the frame portion, a spring element having a terminal portion in the form of a lateral extension, said lateral extension having a fulcrum portion and an abutment portion, said lateral extension extending through said elongated slot with the fulcrum portion thereof hooked over an edge of said slot and rockable thereon, said abutment portion extending interiorly of said frame laterally of said slot and having an end portion engaging with the interior surface of said frame to one side of said slot.

References Cited in the file of this patent
UNITED STATES PATENTS

| | | |
|---|---|---|
| 2,440,001 | Blumensaadt | Apr. 20, 1948 |
| 3,035,828 | Stubnitz | May 22, 1962 |